United States Patent
Akyildiz

(10) Patent No.: US 11,668,215 B2
(45) Date of Patent: *Jun. 6, 2023

(54) CATALYTIC CONVERTER

(71) Applicant: ECC TEC MSJ INCORPORATED, Delray Beach, FL (US)

(72) Inventor: Saban Akyildiz, Delray Beach, FL (US)

(73) Assignee: ECC TEC MSJ INCORPORATED, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/625,074

(22) PCT Filed: Nov. 26, 2019

(86) PCT No.: PCT/US2019/063387
§ 371 (c)(1),
(2) Date: Dec. 20, 2019

(87) PCT Pub. No.: WO2021/080627
PCT Pub. Date: Apr. 29, 2021

(65) Prior Publication Data
US 2022/0243630 A1    Aug. 4, 2022

Related U.S. Application Data

(63) Continuation of application No. 16/664,172, filed on Oct. 25, 2019, now abandoned.

(51) Int. Cl.
*F01N 3/20* (2006.01)
*B01J 23/38* (2006.01)
(Continued)

(52) U.S. Cl.
CPC ....... *F01N 3/2013* (2013.01); *B01D 46/0034* (2013.01); *B01J 23/38* (2013.01);
(Continued)

(58) Field of Classification Search
CPC ...... F01N 3/2013; F01N 3/035; F01N 3/0892; F01N 3/28; F01N 3/2892; B01D 46/0034; B01J 23/38; B01J 35/04
(Continued)

(56) References Cited

U.S. PATENT DOCUMENTS 3,768,982 A * 10/1973 Kitzner .................... B01J 35/02
                                                                422/174
3,956,614 A *  5/1976 Hervert .................. H05B 3/141
                                                                219/541

(Continued)

FOREIGN PATENT DOCUMENTS

CN       2597684 Y    1/2004
CN      205948865 U   2/2017
(Continued)

OTHER PUBLICATIONS

International Search Report and Written Opinion, U.S Patent and Trademark Office, Application No. PCT/US2019/063387, dated Feb. 7, 2020.
(Continued)

*Primary Examiner* — Jelitza M Perez
(74) *Attorney, Agent, or Firm* — Dentons US LLP

(57) ABSTRACT

A catalytic converter includes at least one heating element that is configured to disrupt the direction of flow of exhaust gases which contain harmful toxic gases and pollutants and aid in removing and/or reducing said toxic gases and pollutants.

12 Claims, 10 Drawing Sheets

(51) Int. Cl.
*F01N 3/28* (2006.01)
*F01N 3/08* (2006.01)
*B01J 35/04* (2006.01)
*B01D 46/00* (2022.01)
*F01N 3/035* (2006.01)

(52) U.S. Cl.
CPC .............. *B01J 35/04* (2013.01); *F01N 3/035* (2013.01); *F01N 3/0892* (2013.01); *F01N 3/28* (2013.01); *F01N 3/2892* (2013.01)

(58) Field of Classification Search
USPC ........................................................ 422/174
See application file for complete search history.

(56) References Cited

U.S. PATENT DOCUMENTS

| | | | | |
|---|---|---|---|---|
| 4,363,644 | A * | 12/1982 | Sato | C04B 38/00 428/117 |
| 5,063,029 | A * | 11/1991 | Mizuno | B22F 3/1115 428/116 |
| 5,234,668 | A * | 8/1993 | Harada | F01N 3/2026 428/116 |
| 5,264,186 | A * | 11/1993 | Harada | F01N 3/2026 422/174 |
| 5,423,904 | A * | 6/1995 | Dasgupta | B01D 46/62 55/282 |
| 5,465,573 | A * | 11/1995 | Abe | F01N 13/0097 422/171 |
| 5,569,455 | A | 10/1996 | Fukui et al. | |
| 5,582,805 | A * | 12/1996 | Yoshizaki | F01N 13/009 422/174 |
| 6,585,940 | B2 * | 7/2003 | Abe | B01J 15/005 422/222 |
| 8,309,032 | B2 * | 11/2012 | Plati | B01D 53/9495 422/177 |
| 9,383,119 | B2 * | 7/2016 | Kida | F24H 9/02 |
| 11,149,607 | B2 | 10/2021 | Akyildiz | |
| 2001/0043890 | A1 * | 11/2001 | Son | F01N 3/2882 422/174 |
| 2002/0053283 | A1 | 5/2002 | Akyildiz | |
| 2004/0118111 | A1 | 6/2004 | Covit | |
| 2006/0204408 | A1 * | 9/2006 | Son | B01D 53/885 422/177 |
| 2009/0074630 | A1 | 3/2009 | Gonze | |
| 2011/0162348 | A1 | 7/2011 | Kim et al. | |

FOREIGN PATENT DOCUMENTS

| | | |
|---|---|---|
| CN | 206762544 U | 12/2017 |
| DE | 102009014371 A1 | 9/2010 |
| EP | 0153157 A2 | 8/1985 |
| GB | 2512845 A | 10/2014 |
| JP | 2009097359 A | 5/2009 |
| WO | 2017198292 | 11/2017 |

OTHER PUBLICATIONS

Mohit A. Bagul et al., "Emission Reduction using Magnetic Pollution Filter", International Journal of Innovative Research in Science, Engineering and Technology, vol. 5, Issue 7, Jul. 2016.

Ali S. Faris et al., "Effects of Magnetic Field on Fuel Consumption and Exhaust Emissions in Two-Stroke Engine", Energy Procedia, vol. 18, pp. 327-338, 2012.

Karthik Dhayakar et al., "Effect of Twin Sparkplug in Two Stroke IC Engine", International Journal of Science and Research (IJSR), vol. 4, Issue 2, pp. 2147-2153, Feb. 2015.

Adel Mahmmod Salih et al., "The effect of magnetic field on the boiler performance fueled with diesel", International Journal of Scientific & Engineering Research (IJSER), vol. 7, Issue 2, pp. 406-410, Feb. 2016.

H. R. Jackson et al., "Catalytic NOx Reduction Studies", SAE Technical Paper, 730568, 1973, doi: 10.4271/730568.

* cited by examiner

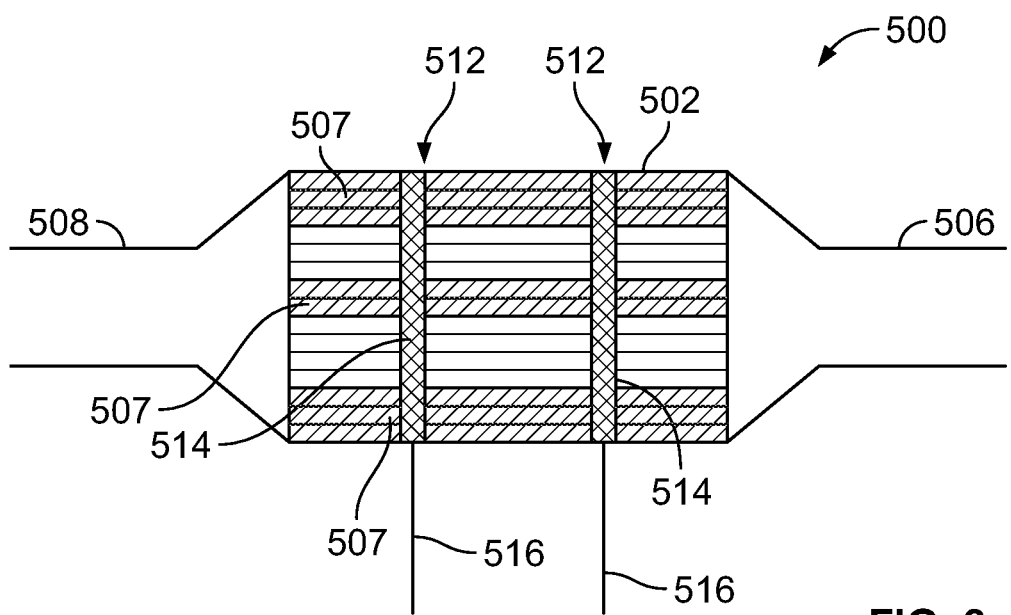
FIG. 8
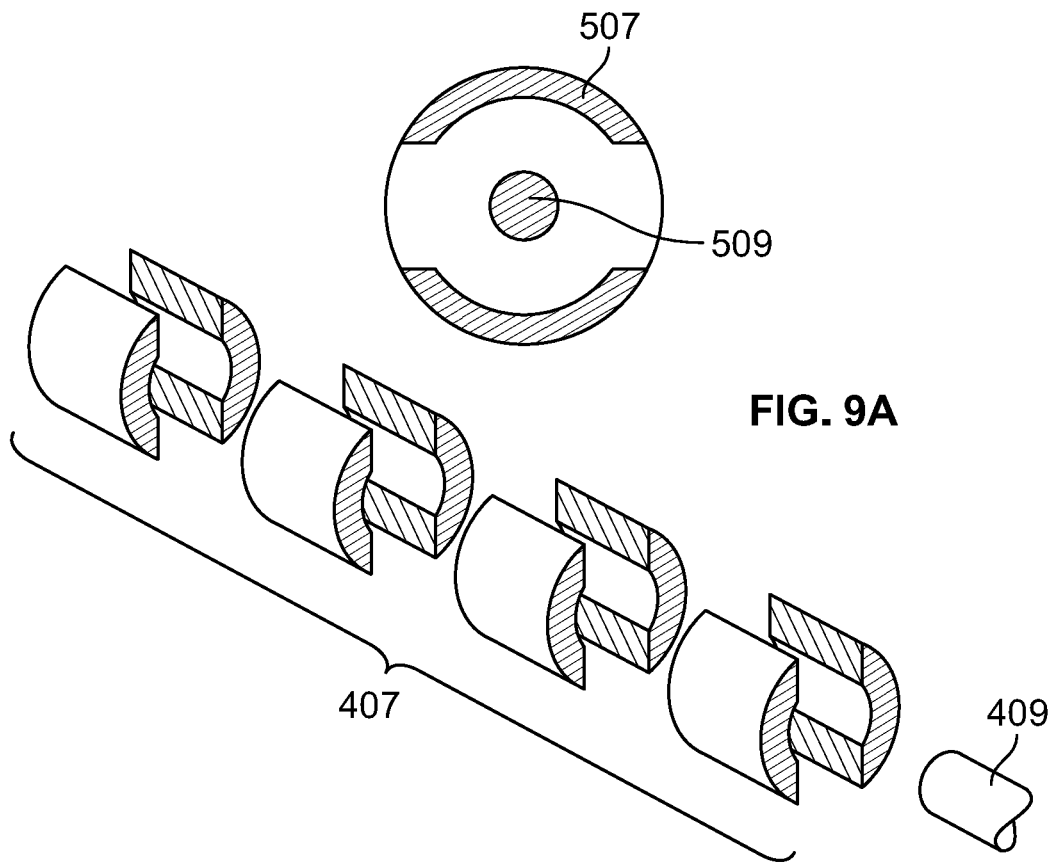
FIG. 9A
FIG. 9B

CATALYTIC CONVERTER

FIELD OF THE INVENTION

The present invention relates generally to catalytic converters for use with flowing exhaust gases and more particularly to catalytic converters that have internal elements that are incorporated therein and/or added thereto that disrupt the direction of flow of exhaust gases which contain harmful toxic gases and pollutants and aid in removing and/or reducing said toxic gases and pollutants.

BACKGROUND OF THE INVENTION

A catalytic converter is a vehicle emissions control device that converts toxic gases and pollutants in exhaust gas to less toxic pollutants, by catalyzing a redox reaction (oxidation or reduction). Catalytic converters are commonly used in conjunction with internal combustion engines fueled by either gasoline or diesel.

Although catalytic converters are most commonly applied to exhaust systems in automobiles, they are also used on electrical generators, forklifts, mining equipment, trucks, buses, locomotives, motorcycles, airplanes and wood stoves to control emissions.

A cordierite ceramic substrate is used in most catalytic converters. For automotive catalytic converters, the core of a catalytic converter is usually a ceramic monolith with a honeycomb structure. In applications where particularly high heat resistance is required, metallic foil monoliths made of Kanthal (FeCrAl) are commonly used. Both materials are designed to provide a large surface area.

Catalytic converters can include a washcoat, which is a carrier for the catalytic materials that is used to disperse the materials over a large surface area. Aluminum oxide, titanium dioxide, silicon dioxide, or a mixture of silica and alumina can be used. The catalytic materials are suspended in the washcoat prior to applying to the core. Washcoat materials are selected to form a rough, irregular surface, which greatly increases the surface area compared to the smooth surface of the bare substrate. This in turn maximizes the catalytically active surface available to react with the engine exhaust.

Since 1981, "three-way" (oxidation-reduction) catalytic converters have been used in vehicle emission control systems in the United States and Canada. Many other countries have also adopted stringent vehicle emission regulations that in effect require three-way converters on gasoline-powered vehicles. The reduction and oxidation catalysts are typically contained in a common housing. However, in some instances, they may be housed separately. A three-way catalytic converter has three simultaneous tasks:

(1) Reduction of nitrogen oxides to nitrogen and oxygen: $2NOx \rightarrow xO2+N2$;

(2) Oxidation of carbon monoxide to carbon dioxide: $2CO+O2 \rightarrow 2CO2$; and (3) Oxidation of unburnt hydrocarbons to carbon dioxide and water: $CxH2x+2+[(3x+1)/2]O2 \; xCO2 +(x+1)H2)$.

Three-way catalysts are effective when the engine is operated within a narrow band of air-fuel ratios near stoichiometry such that the exhaust gas oscillates between rich (excess fuel) and lean (excess oxygen) conditions, which is between 14.6 and 14.8 parts air to 1 part fuel by weight for gasoline. The ratio for liquefied petroleum gas (LPG), natural gas and ethanol fuels is each slightly different, requiring modified fuel system settings when using those fuels. However, conversion efficiency falls very rapidly when the engine is operated outside of that band of air-fuel ratios. Under lean engine operation, there is excess oxygen and the reduction of NOx is not favored. Under rich conditions, the excess fuel consumes all of the available oxygen prior to the catalyst, thus only stored oxygen is available for the oxidation function. Closed-loop control systems are necessary because of the conflicting requirements for effective NOx reduction and HC oxidation. The control system must prevent the NOx reduction catalyst from becoming fully oxidized, yet replenish the oxygen storage material to maintain its function as an oxidation catalyst.

U.S. Pat. No. 5,180,559, for example, is concerned with the inefficiency of catalytic converters at low temperature, particularly during light-off time when an engine is first started and is directed to a method for reducing the light off time that comprises exposing the matrix of the converter to an alternating magnetic field or to electromagnetic radiation having such a frequency that the wash coat and the particles of catalyst supported by the matrix are heated to the light-off temperature without a corresponding increase in the temperature of the entire matrix.

Static magnetic fields are not used once the materials have been heated.

SUMMARY OF THE INVENTION

The present invention is generally directed to a catalytic converter that includes heating elements and a support lattice coated with a catalytic material. Disruptor plates can be located at inlet and outlet ports to add agitation to the flow of exhaust gases across the support lattice and have an array of holes arranged across the direction of flow of the exhaust gases. The array of holes forms a pseudorandom pattern. The disruptor plates are oriented orthogonal to the longitudinal axis of the external shell.

In an embodiment, the catalytic converter can include a support lattice through which a magnetic field is maintained to aid in the circulation of exhaust gases and other particulates in a catalytic converter. There can be an outer shell at least partially surrounding the external shell of a catalytic converter with a plurality of magnets located between the shells. The magnets can, for example, have a curved shape and/or can be arranged in sets. The magnets may lie in an array having alternating polarities. Magnets that face each other may also have opposing. Alternatively, magnets can have the same polarity and the polarity might not vary along the longitudinal direction of the converter. An array of magnets may be placed to abut the external shell from inside the shell and there may be a central core magnetic rod.

BRIEF DESCRIPTION OF THE DRAWINGS

FIG. 8 is a cross-sectional view of a catalytic converter that includes internal magnets according to an exemplary embodiment of the present disclosure;

FIG. 9A is a cross-sectional view of one of the internal magnets of the catalytic converter of FIG. 8;

FIG. 9B is an exploded view of the internal magnets of the catalytic converter of FIG. 8;

DETAILED DESCRIPTION OF EMBODIMENTS OF THE INVENTION

With reference now to the drawings, and in particular to FIGS. 1-14, embodiments of catalytic converters embodying the principles and concepts of the present invention will be described.

Figure 1:
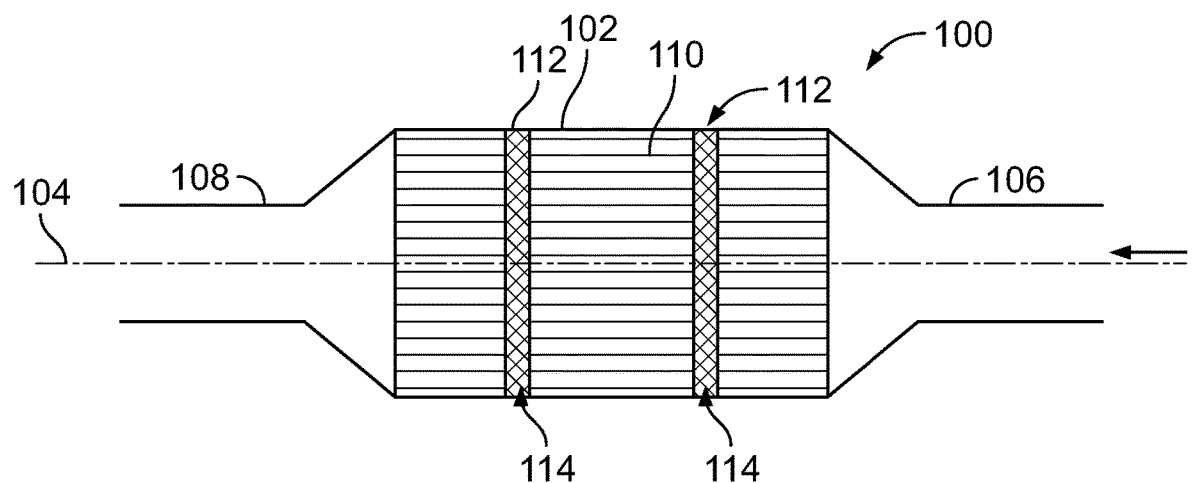
FIG. 1 is a cross-sectional view of a known catalytic converter.
Figure 2:
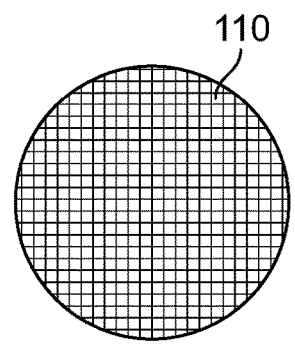
FIG. 2 is a side view of a support lattice of the catalytic converter of FIG. 1.

FIG. 1 illustrates a cross-sectional view of a catalytic converter 100 that extends along a longitudinal axis 104 and comprises an external shell 102, an inlet port 106 and an outlet port 108. Internal to the external shell 102 is an internal support lattice 110 that can be divided into sections by spaces 112. Heating elements 114, which are configured to heat the internal temperature of the catalytic converter 100, can be arranged within the spaces 112 of the lattice 100. The heating elements 114 are configured to heat the internal temperature of the catalytic converter 100 which in turn aids in the removal of harmful gases and particulate matter within the catalytic converter 100. The support lattice 110 (see FIG. 2 for end view thereof) is coated with a catalytic material to maximize contact with toxic gases and particulates and slow down the flow of these gases and particulates from the inlet port 106 to the outlet port 108 to allow the heating elements to further aid in the removal of harmful gases and particulate matter within the catalytic converter 100.

The coat must retain its surface area and prevent sintering of the catalytic metal particles even at high temperatures (1000° C.). The catalyst itself, most often is a mix of precious metals. Platinum is the most active catalyst and is widely used, but is not suitable for all applications because of unwanted additional reactions and high cost. Palladium and rhodium are two other precious metals used. Rhodium is used as a reduction catalyst, palladium is used as an oxidation catalyst, and platinum is used both for reduction and oxidation. Cerium, iron, manganese and nickel are also used, although each has limitations. Nickel is not legal for use in the European Union because of its reaction with carbon monoxide into toxic nickel tetracarbonyl. Copper can be used everywhere except North America, where its use is illegal because of the formation of toxic dioxin.

Figure 3:
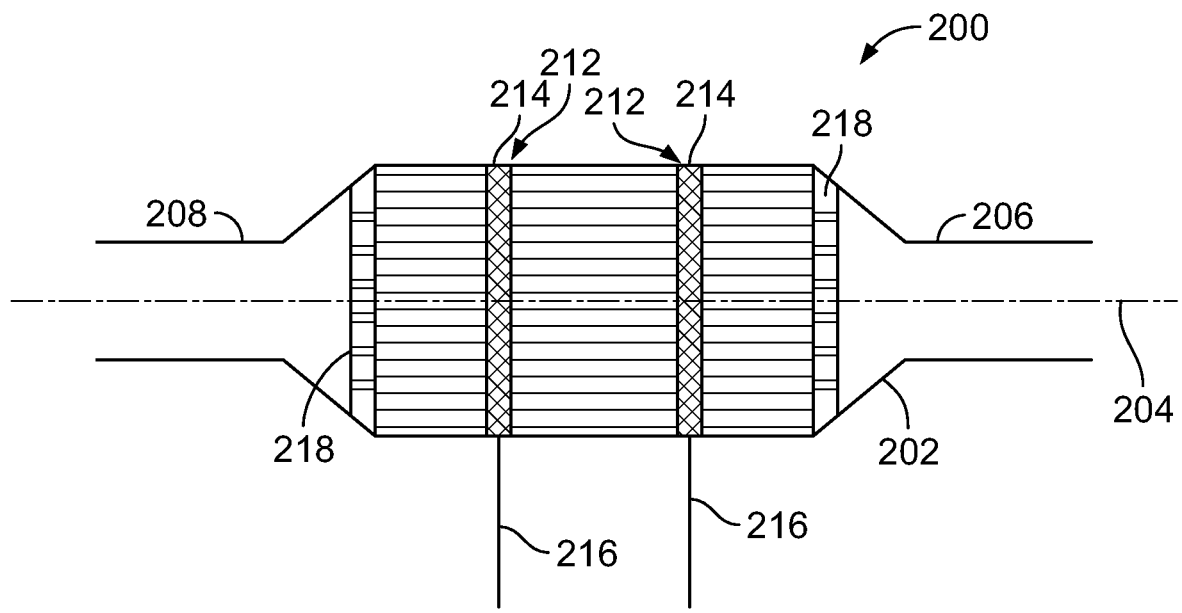
FIG. 3 is a cross-sectional view of a known catalytic converter with disrupter plates.

FIG. 3 illustrates another exemplary embodiment of a catalytic converter 200 with electrical heating elements 214 arranged in spaces 212. Electrical leads 216 extend from and supply energy to the heating elements 214, which can be, for example, constructed of nichrome wire. It is noted that electrical leads 216 can also be used to supply energy to the heating elements 114 as depicted in FIG. 1. Here, disruptor plates 218 are placed near an inlet port 206 and an outlet port 208. The disruptor plates 218 are included to add agitation to the flow of exhaust gases across support lattice 210. The support lattice 210, similar to the support lattice 110 shown in FIG. 1, is coated with a catalytic material to maximize contact with toxic gases and particulates and further aid in slowing down the flow of these gases within the catalytic converter and allow for the heating elements to at least further reduce harmful gases and particulate matter.

Figure 4A:
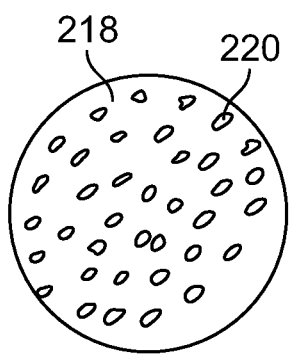
FIGS. 4A-4C are side views of the disruptor plates of the catalytic converter of FIG. 3.
Figure 4B:
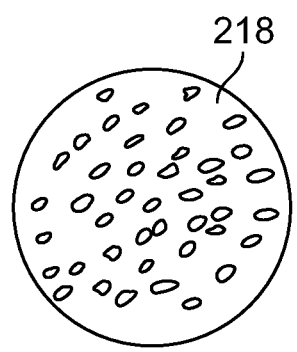
Figure 4C:
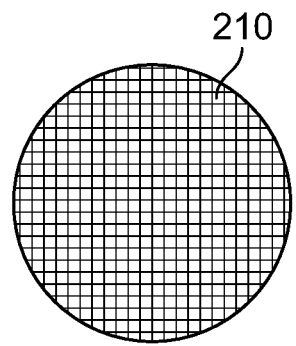

FIGS. 4A-4C shows an end view of a disrupter plate 218 that includes of an array of holes 220 that extend across the direction of flow of the exhaust gases. The array of holes are scattered about the plate 218 and are termed a pseudorandom pattern. As shown in FIG. 3, the disruptor plates 218 are oriented orthogonal to a longitudinal axis 204 of an external shell 202.

Figure 5:
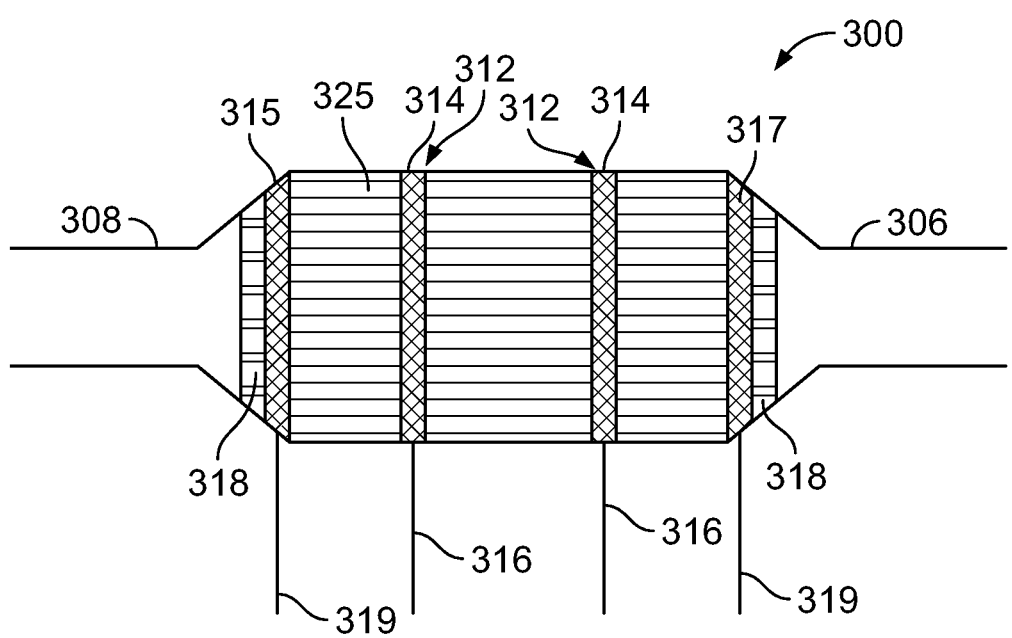
FIG. 5 is a cross-sectional view of a catalytic converter with supplemental heating elements and disruptor plates according to an exemplary embodiment of the present disclosure.

FIG. 5 depicts another exemplary embodiment of a catalytic converter 300 of the present invention. The catalytic converter 300 includes heating elements 314 arranged in openings 312 of the internal support lattice 310 with electrical leads 316 extending therefrom to supply power to the heating elements 314 and secondary planar heating elements 315, 317 that are arranged near an inlet port 306 and/or an outlet port 308, adjacent to disruptor plates 318. Additional electrical leads 319 supply energy to the secondary planar heating elements 315, 317. Although some of the various elements are described as planar or having particular orientations, it is not required that these geometrical restrictions be exact, and approximations thereto are within the description of the various embodiments. Disruption of normal, substantially lamellar flow of exhaust gases can lead to an enhancement of the efficiency of the catalytic converter 300. As such, by including multiple heating elements 314, 315, 317 and disrupter plates 318 the reduction of toxic gases and particulate matter exiting a catalytic converter is greatly reduced.

The secondary heating elements 315, 317 can also be placed near a filter/support lattice 325 in addition to or in place of near the inlet port 306 and/or outlet port 308. The catalytic converter 300 aids in destroying and removing harmful gases and particulate matter as they pass through the catalytic converter 300.

The secondary heating elements 315, 317 can be configured to heat the internal temperature of the catalytic converter 300 to about 800° C. to 1200° C. which aids in the removal of harmful gases and particulate matter within the catalytic converter 300. The support lattice/filter 325 (see also FIG. 11) can be coated or sprayed with noble metals to aid in maintaining an internal temperature of about 800° C. to 1200° C. and in turn aid further in the removal of harmful gases and particulate matter.

Figure 6:
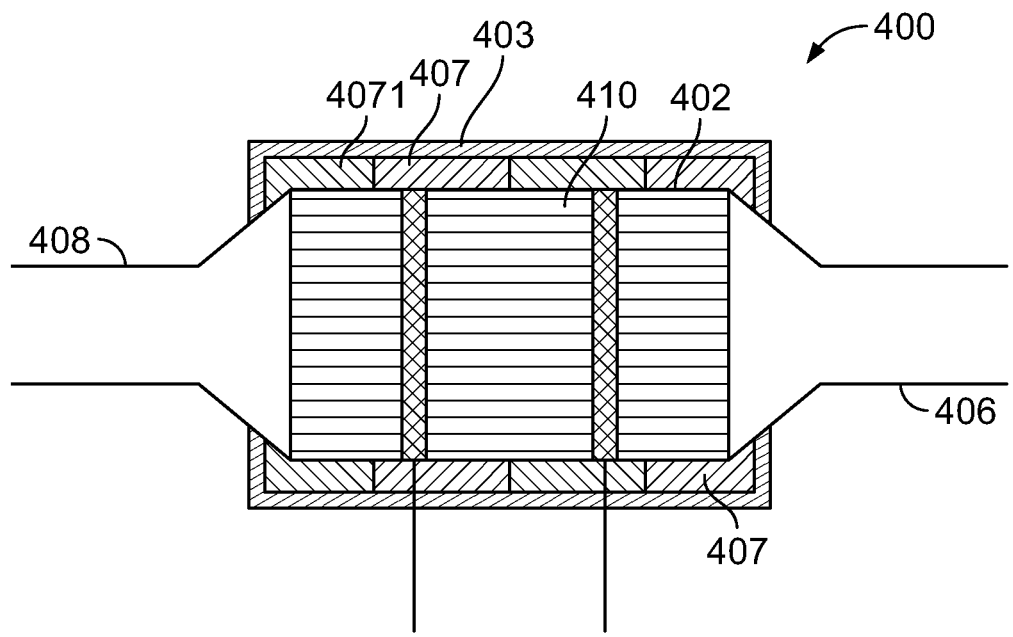
FIG. 6 is a cross-sectional view of a catalytic converter that includes external magnets.
Figure 7:
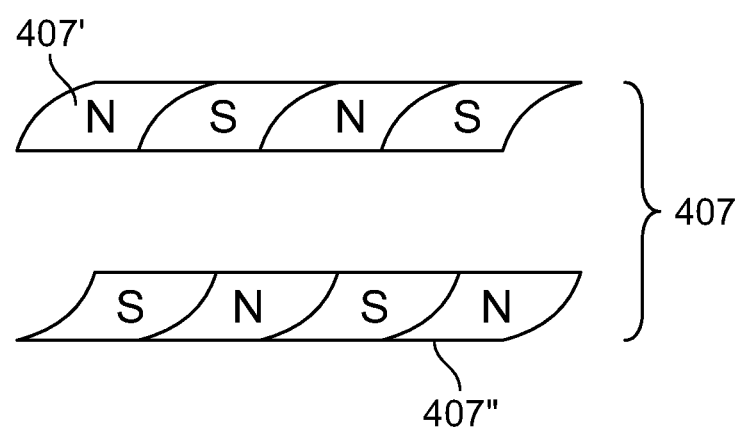
FIG. 7 is an arrangement of the external magnets.

FIG. 6 illustrates yet another exemplary embodiment of a catalytic converter 400 that includes a support lattice 410 through which a magnetic field is maintained between an inlet port 406 and an outlet port 408. Here, the catalytic converter 400 is enhanced with an encompassing shell 402 partially surrounding an external shell 403. A plurality of magnets 40 are located between the shells 402, 403. As shown in FIG. 7, the magnets 407 may have a curved shape to approximate the outer geometry of the external shell 403 and may be provided in two sets 407', 407". The magnets 407 may lie in an array having alternating polarities as shown in FIG. 7. Magnets 407 that face each other may also have opposing polarity although that is not required. Alternatively, the magnets 407 can have the same polarity and the polarity might not vary along the longitudinal direction of the converter 400. Having opposite polarity facing each other will result in the stronger magnetic field.

It is noted that the electrical leads 316, 416 are attached to a control unit (see FIG. 10) 421 that is capable of switching between the heating units 415, 417 (and 315, 317) and maintaining a desired temperature, as desired at between about 10 and 30 amps.

FIG. 8 shows another exemplary embodiment of a catalytic converter 500 of the present disclosure in which an array of magnets 507 are placed to abut an external shell 502 from inside the shell 502. Similar to other embodiments, heating elements 514 are arranged in openings 512 of support lattice 510 with electrical leads that power the heating elements 514 extending from the heating elements 514.

FIG. 9A an end view of the magnets 507 and FIG. 8B depicts an exploded view of the magnets 507. It is noted that there may be a central core magnetic rod 509 as part of the set of magnets 507. Such a core 509 is not essential, but increases the possibility for different arrangements of polarity of the magnets 507. For example, the outer magnets 507 that face each other may have the same or different polarities, which may vary along the longitudinal direction. In addition, the core magnetic rod 509 may be one piece extending from the inlet port 506 to the outlet port 508, with one polarity at each end or it may be made of segments that are separated from each other in the longitudinal direction and have polarities that vary in the longitudinal direction. Although the magnets 507 have been depicted as fixed magnets, they may also be electromagnets maintained by current sources (not shown).

Figure 10:
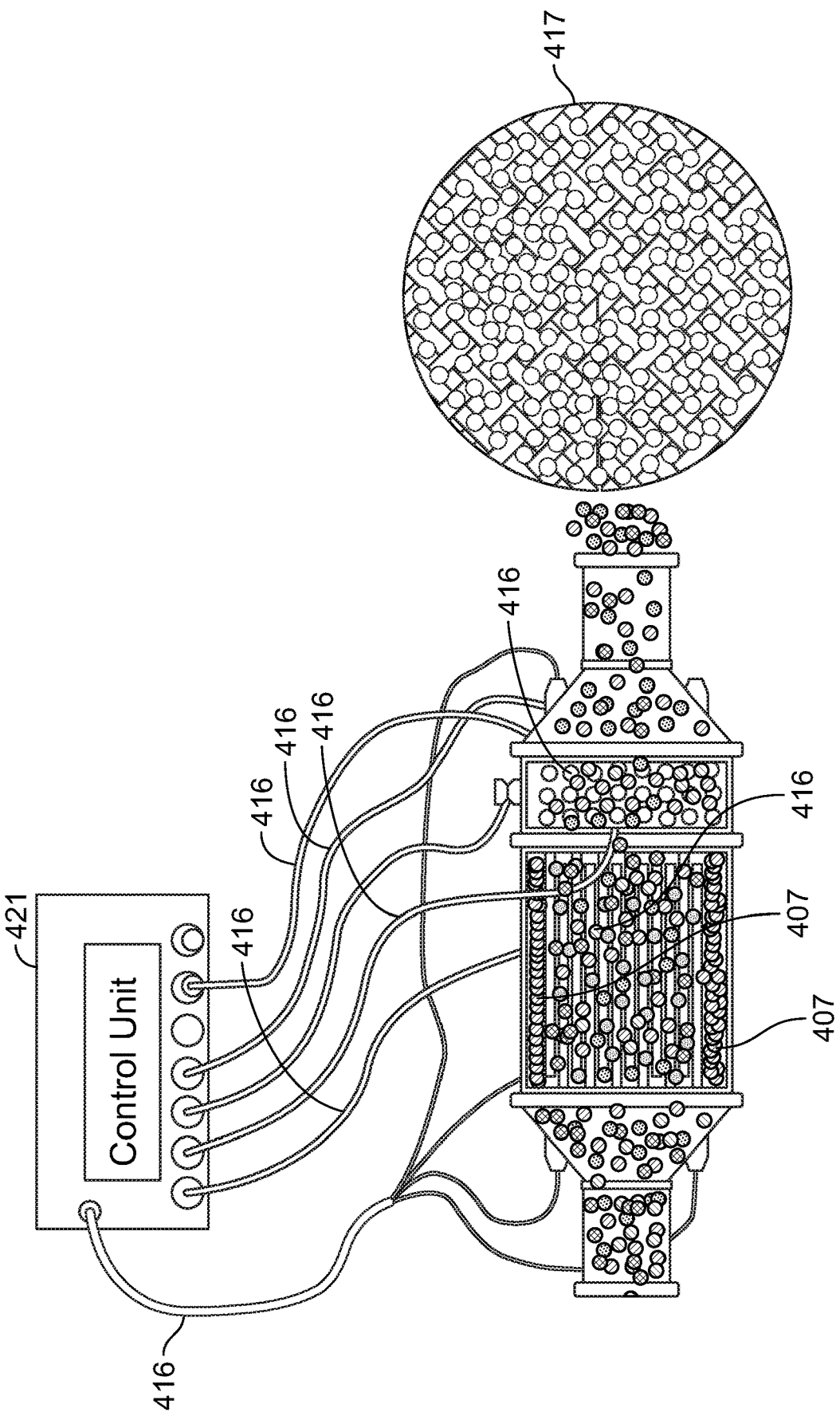
FIG. 10 is a partial cross-sectional view of an internal system of a catalytic converter that includes heaters and electrical systems related thereto according to an exemplary embodiment of the present disclosure.

FIG. 10 depicts electronic connections of a catalytic converter.

Figure 11:
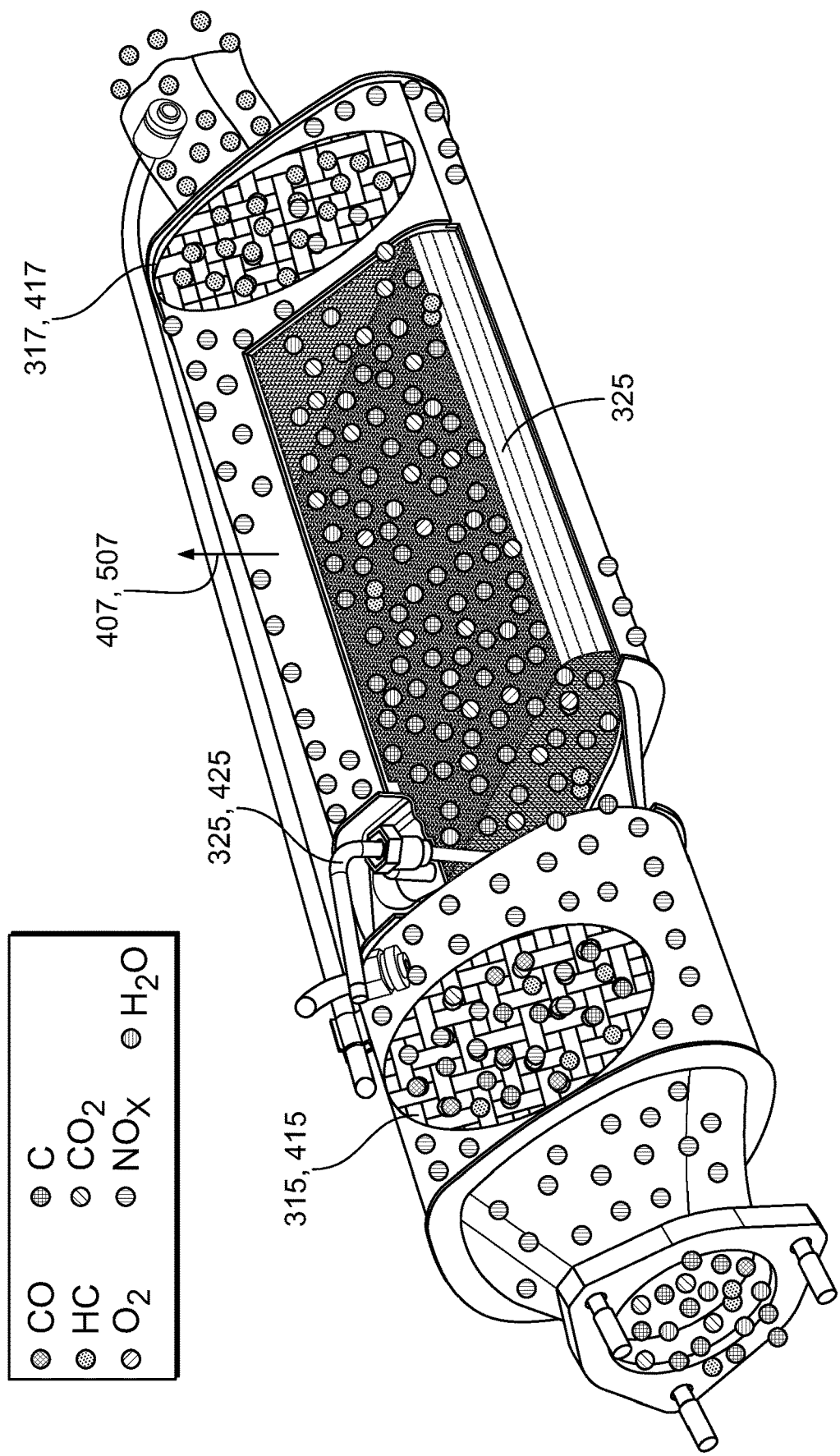
FIG. 11 is a partial cross-sectional view of the catalytic convert of FIG. 10 showing internal electrical heaters according to an exemplary embodiment of the present disclosure.

As shown in FIG. 11, temperature sensors 325, 425 can be placed near the additional heaters 315, 415, 317, 417 to aid in ensuring proper internal temperature is maintained.

Figure 12:
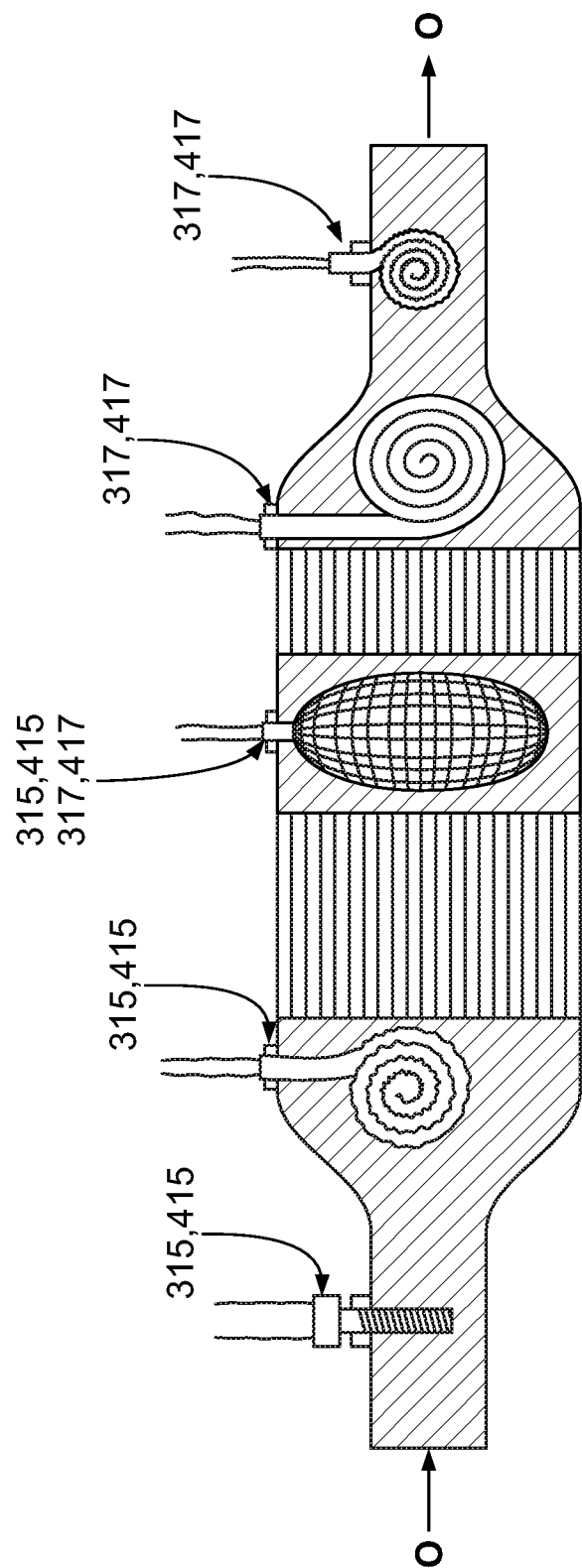
FIG. 12 is a cross-sectional view of a catalytic convert of showing various possible locations of internal electrical heaters according to an exemplary embodiment of the present disclosure.

FIG. 12 depicts an exemplary embodiment of a catalytic converter of the present invention indicating that secondary heaters 315, 415, 317, 417 can be placed at various locations within the catalytic converter and any number of secondary heaters can be used depending on the size of the unit.

Figure 13B:
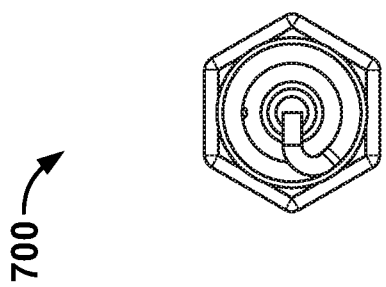
FIGS. 13A and 13B are a perspective and end view of a coil heather that can represent at least one heater included in a catalytic converter system of the present disclosure.
Figure 13A:
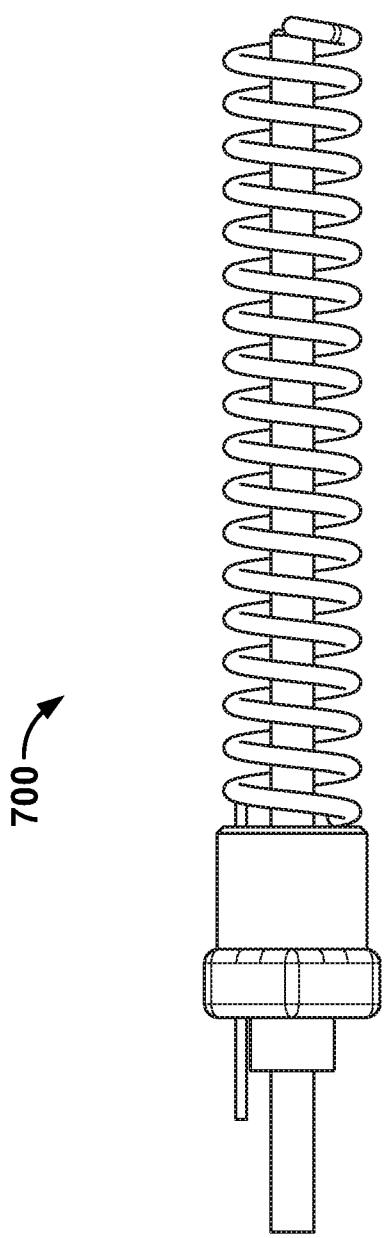

FIGS. 13A and 13B depict an embodiment of one type of additional heater 700 that that can be inserted into a catalytic converter from the outside thereof and screwed in place. As such, the heater 600 is removal if needed.

Figure 14:
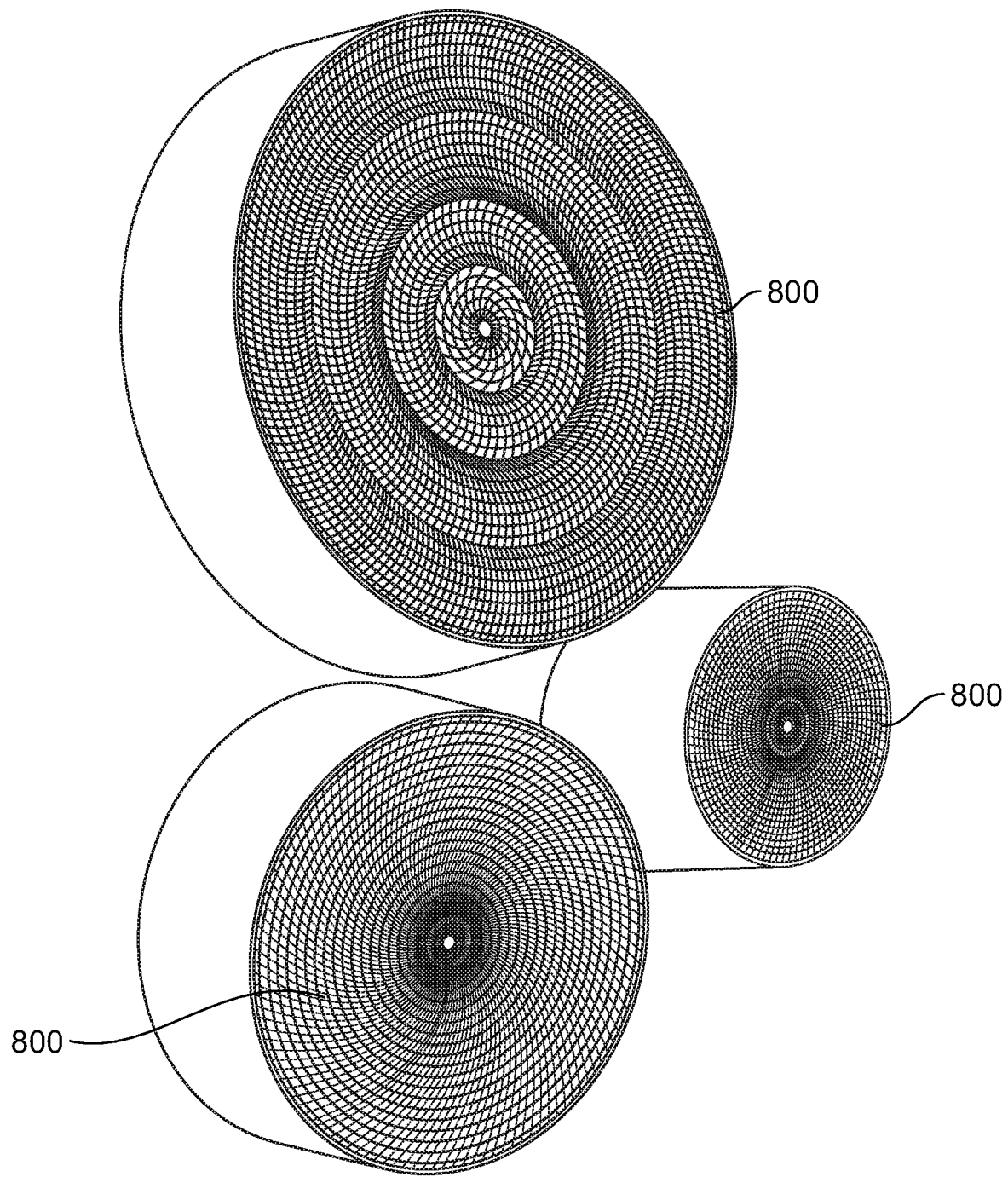
FIG. 14 is an exemplary embodiment of another heater that can be arranged within catalytic converter.

FIG. 14 depicts another embodiment of an additional heater 800 that that can arranged in a catalytic converter.

In use, the catalytic converter 100, 200, 300, 400, 500 is placed so that gases to be treated flow from the inlet port 106, 206, 306, 406, 506 through disruptor plates 318 (in some embodiments), through a secondary heating element 114, 214, 314, 414, 515 and enter a volume in which they are subjected both to additional heating in some embodiments from additional heaters 317, 318 and magnetic fields by magnets 407, 507. The additional heaters and/or magnetic fields can interact with the individual molecules and ions of the gases passing through catalytic converters and increase the efficiency of catalytic conversion that takes place before exiting a catalytic converter.

It is noted that in addition to heaters being included within a catalytic converter, they can be added to existing catalytic converters.

The foregoing description and accompanying drawings illustrate principles, exemplary embodiments, and modes of operation of the present invention. However, the present invention should not be construed as being limited to the particular embodiments disclosed herein. Variations to the embodiments discussed above will be appreciated by those skilled in the art without departing from the scope of the invention. Accordingly, the above-described embodiments and accompanying drawings should be regarded as illustrative rather than restrictive.

What is claimed is:

1. A catalytic converter, comprising:
an external shell delimited at an inlet port and an outlet port;
at least one heater arranged within the external shell that is configured to heat toxic gases and particulate matter that enter the catalytic converter and at least reduce said gases and particulate matter prior to said gases and particulate matter exiting the catalytic converter;
a second shell spaced from the external shell; and
magnets arranged between the external shell and the second shell,
wherein the catalytic converter is a component of a vehicle exhaust system.

2. The catalytic converter of claim 1, wherein a plurality of heaters are arranged in the external shell with a first heater arranged near the inlet port and a second heater arranged near the outlet port.

3. The catalytic converter of claim 1, further comprising a disrupter plate arranged adjacent the at least one heater.

4. The catalytic converter of claim 1, further comprising a filter arranged within the external shell between the inlet port and the outlet port that is at least one of coated and sprayed with noble metals to aid in maintaining an internal temperature of the catalytic converter.

5. A heater, comprising:
a top portion; and
a bottom portion comprising a heating element;
wherein the heater is configured to be attached to a housing of a catalytic converter, the housing delimited by an inlet port and an outlet port,
wherein the top portion of the heater is located outside of the housing and the heating element is located inside the housing to heat toxic gas and/or particulate matter passing through the housing,
wherein the catalytic converter comprises an outer covering spaced from an exterior surface of the housing and a magnet arranged between the exterior surface and the outer covering to generate a magnetic field within the housing, and
wherein the heater and the magnetic field are configured to interact with the toxic gas and/or particulate matter passing through the housing to increase the efficiency of catalytic conversion inside the housing and reduce the toxic gas and/or particulate matter exiting the housing.

6. The heater of claim 5, wherein the heating element is configured to heat the toxic gases and particulate matter.

7. The heater of claim 5, wherein the heater is disposed at the inlet port of the housing.

8. The heater of claim 5, wherein the heater is disposed at the outlet port of the housing.

9. The heater of claim 5, wherein the heater comprises a first heater disposed at the inlet port of the housing and a second heater disposed at the outlet port of the housing.

10. The heater of claim 5, wherein the heater is removably attached to the housing.

11. The heater of claim 5, wherein the heater is inserted from the outside of the housing and screwed in place.

12. The heater of claim 5, wherein the catalytic converter is a component of a vehicle exhaust system.

\* \* \* \* \*